United States Patent
Thwing

(10) Patent No.: US 7,526,429 B2
(45) Date of Patent: Apr. 28, 2009

(54) SPELLED SPEECH RECOGNITION METHOD AND SYSTEM ACCOUNTING FOR POSSIBLE MISRECOGNIZED CHARACTERS

(75) Inventor: Gary Thwing, Watsonville, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 653 days.

(21) Appl. No.: 10/800,123

(22) Filed: Mar. 12, 2004

(65) Prior Publication Data

US 2005/0203741 A1 Sep. 15, 2005

(51) Int. Cl.
*G10L 15/00* (2006.01)
*G10L 15/04* (2006.01)

(52) U.S. Cl. .................... 704/235; 704/251; 704/254
(58) Field of Classification Search ................. None
See application file for complete search history.

(56) References Cited

U.S. PATENT DOCUMENTS

| | | | | |
|---|---|---|---|---|
| 5,995,928 A * | 11/1999 | Nguyen et al. | ............ | 704/251 |
| 6,061,654 A | 5/2000 | Brown et al. | | |
| 6,208,965 B1 * | 3/2001 | Brown et al. | ............ | 704/246 |
| 6,223,158 B1 | 4/2001 | Goldberg | | |
| 6,400,805 B1 * | 6/2002 | Brown et al. | ............ | 379/88.01 |
| 6,741,985 B2 * | 5/2004 | Green | ............ | 707/5 |
| 7,242,758 B2 * | 7/2007 | Mane et al. | ............ | 379/218.01 |
| 2002/0174147 A1 * | 11/2002 | Wang et al. | ............ | 707/513 |
| 2003/0023440 A1 | 1/2003 | Chu | | |
| 2003/0212558 A1 | 11/2003 | Matula | | |
| 2004/0030557 A1 | 2/2004 | Culy et al. | | |
| 2006/0219780 A1 * | 10/2006 | Swartz et al. | ............ | 235/383 |

FOREIGN PATENT DOCUMENTS

EP 1 085 499 A 3/2001

OTHER PUBLICATIONS

Matt Marx et al., Reliable spelling despite poor spoken letter recognition, Proc. of the American Voice I/O Society, San Jose, CA, Sep. 20-22, 1994.

* cited by examiner

*Primary Examiner*—David R Hudspeth
*Assistant Examiner*—Samuel G Neway

(57) ABSTRACT

Caller interface systems and methods are described. In one aspect, a sequence of recognized characters beginning with a first recognized character and ending with a last recognized character is received. Successive characters are selected one at a time from the recognized character sequence in order beginning with the first recognized character. For each selected character, a current potential match set of potential character string matches is constructed by: appending characters selected from a set of misrecognized characters including the selected character to each potential character string match in a prior potential match set constructed for a preceding selected character, if any; and deleting from the current potential match set potential character string matches missing from a list of reference character strings. A reference data item corresponding to the potential character string match in a current potential match set containing one a single potential character string match is transmitted for presentation to a caller after non-matching potential character string matches have been deleted.

30 Claims, 4 Drawing Sheets

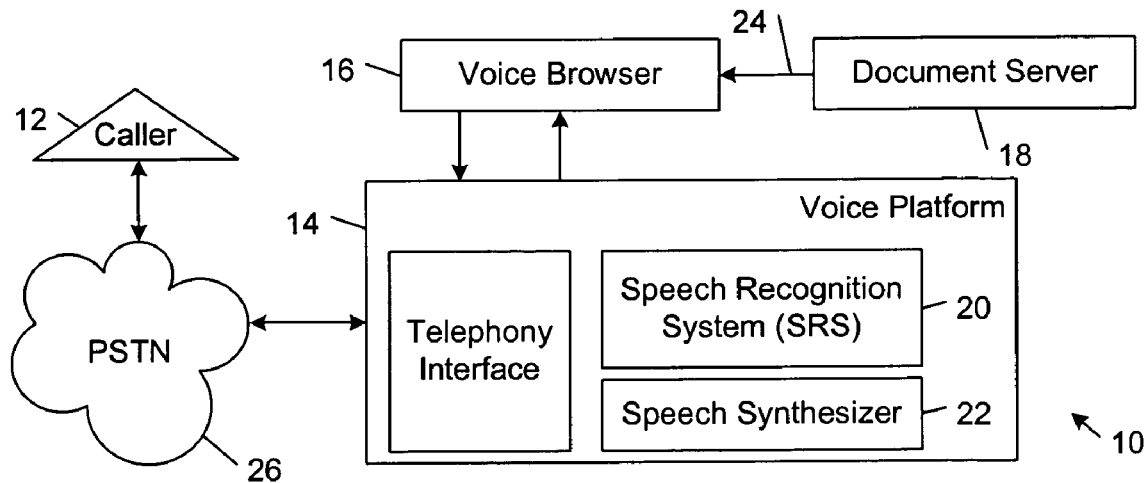

FIG. 1

```
<grammar type="application/grammar+xml" mode="voice" xml:lang="en-US"
version~"I.O" root="spellGram" weight="I.O">
    <rule id="spellGram" scope="public">
        <count number=" 1 +">
            <ruleref uri="#Letters"/>
        </count>
    </rule>
    <rule id="Letters" scope="public">
        <one-of>
            <item>a</item>
            <item>b</item>
            <item>c</item>
            <item>d</item>
                ⋮
            <item>x</item>
            <item>y</item>
            <item>z</item>
        <lone-of>
    </rule>
</grammar>
```

FIG. 3

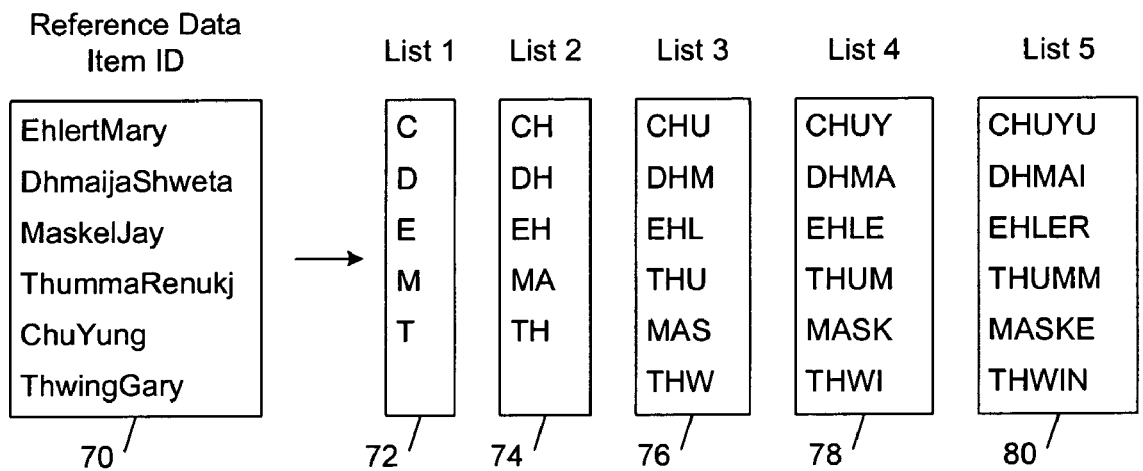
FIG. 6
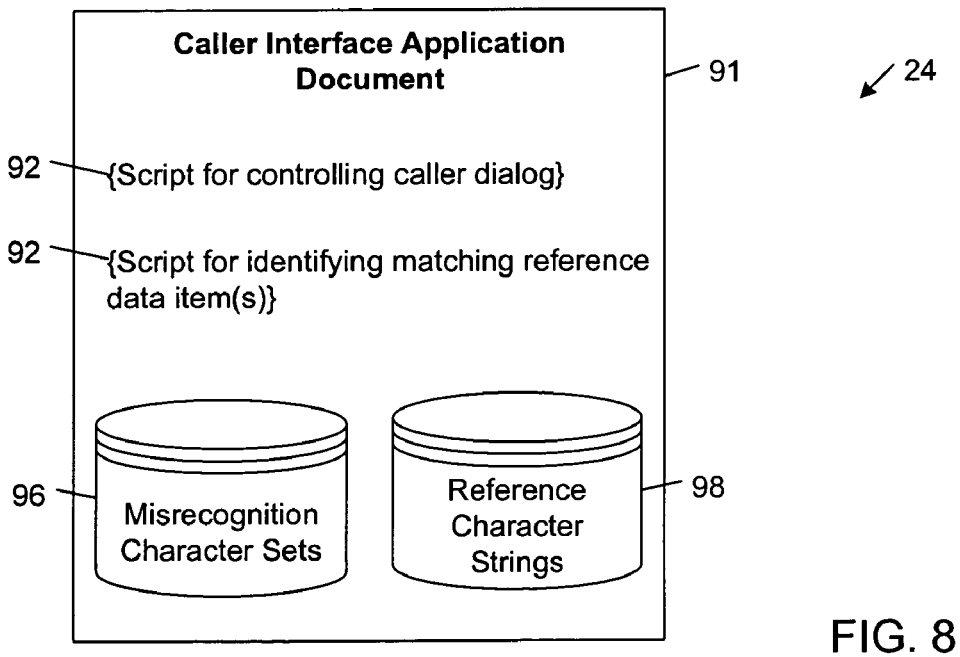
FIG. 7
FIG. 8

SPELLED SPEECH RECOGNITION METHOD AND SYSTEM ACCOUNTING FOR POSSIBLE MISRECOGNIZED CHARACTERS

BACKGROUND

Large enterprises receive numerous telephone calls, each of which must be routed in accordance with callers' instructions. Calls typically are routed by a human operator or an automated call routing system (commonly referred to as an "automated attendant" or "autoattendant"). Human operators typically route calls accurately and efficiently, but at a relatively high cost. Autoattendant systems, on the other hand, typically are cheaper to implement, but tend to be less accurate and efficient than human operators.

Traditionally, autoattendants play an announcement to the caller and prompt a caller to make one of multiple selections using a voice response unit. For example, the caller may be prompted to dial the extension of the party being called. The caller also may be given other options, such as leaving a voice message or accessing a directory of names if the extension of the called party is not known. Some early automated telephone directories required the caller to spell the name of the called party using a telephone dual-tone multifrequency (DTMF) keypad. Most recent autoattendant systems are voice-enabled, allowing callers to be routed to a desired call destination simply by speaking the name of the call destination. In these systems, an autoattendant answers an incoming call and asks the caller to speak the name of the party or department being called. The autoattendant includes a speaker-independent speech recognition engine that identifies and translates a received speech signal into name data. The autoattendant obtains a telephone number corresponding to the translated name data from a telephone number directory based on the translated name data, and routes the call to that telephone number.

Some autoattendant systems require the user to spell the identifier for a requested data item, such as a person's name. Some of these autoattendant systems attempt to identify the identifier being spelled by the caller before the caller has said all of the characters in the identifier. Such autoattendant systems may employ algorithms for disambiguating characters that often are misrecognized for one another. For example, speech recognizers typically confuse the letters B, C, D, E, G, P, T, V, and Z for one another. One discrete-spoken spelling system prompts the caller to say one letter at a time so that the system can know many letters were spoken and can identify and process each spoken letter separately. In addition, the system keeps track of all possible letter sequences while the caller continues to spell the requested identifier. The system compares each letter sequence with a list of allowable words and identifies the spelled identifier as soon as the list is reduced to a single identifier.

In another approach, a speech recognition system recognizes a word based on a continuous spelling of the word by a user. The system includes a speech recognition engine with a decoder running in forward mode such that the recognition engine continuously outputs an updated string of hypothesized letters based on the letters uttered by the user. The system further includes a spelling engine for comparing each string of hypothesized letters to a vocabulary list of words. The spelling engine returns a best match for the string of hypothesized letters. The system also includes an early identification unit for presenting the user with the best matching word possibly before the user has completed spelling the desired word.

SUMMARY

In one aspect, the invention features a machine-implemented caller interface method. In accordance with this inventive method, a sequence of recognized characters beginning with a first recognized character and ending with a last recognized character is received. Successive characters are selected one at a time from the recognized character sequence in order beginning with the first recognized character. For each selected character, a current potential match set of potential character string matches is constructed by: appending one or more characters selected from a set of misrecognized characters including the selected character to each potential character string match in a prior potential match set constructed for a preceding selected character, if any; and deleting from the current potential match set potential character string matches missing from a list of reference character strings. A reference data item corresponding to the potential character string match in a current potential match set containing a single potential character string match is transmitted for presentation to a caller after non-matching potential character string matches have been deleted.

The invention also features a system and a machine-readable medium storing machine-readable instructions for implementing the caller interface method described above.

Other features and advantages of the invention will become apparent from the following description, including the drawings and the claims.

DESCRIPTION OF DRAWINGS

FIG. 1 is a diagrammatic view of a caller connected to an embodiment of a voice-based caller interface system.

FIG. 3 is a grammar specifying all of the letters from "a" through "z" for a speech recognition system.

FIG. 6 is an implementation of a table containing multiple sets of misrecognized characters.

FIG. 7 is a diagrammatic view of implementations of a reference data item identifier table and multiple tables containing reference character strings derived from the identifiers in the reference data item identifier table.

FIG. 8 is a diagrammatic view of an embodiment of a caller interface application document.

DETAILED DESCRIPTION

Figure 2:
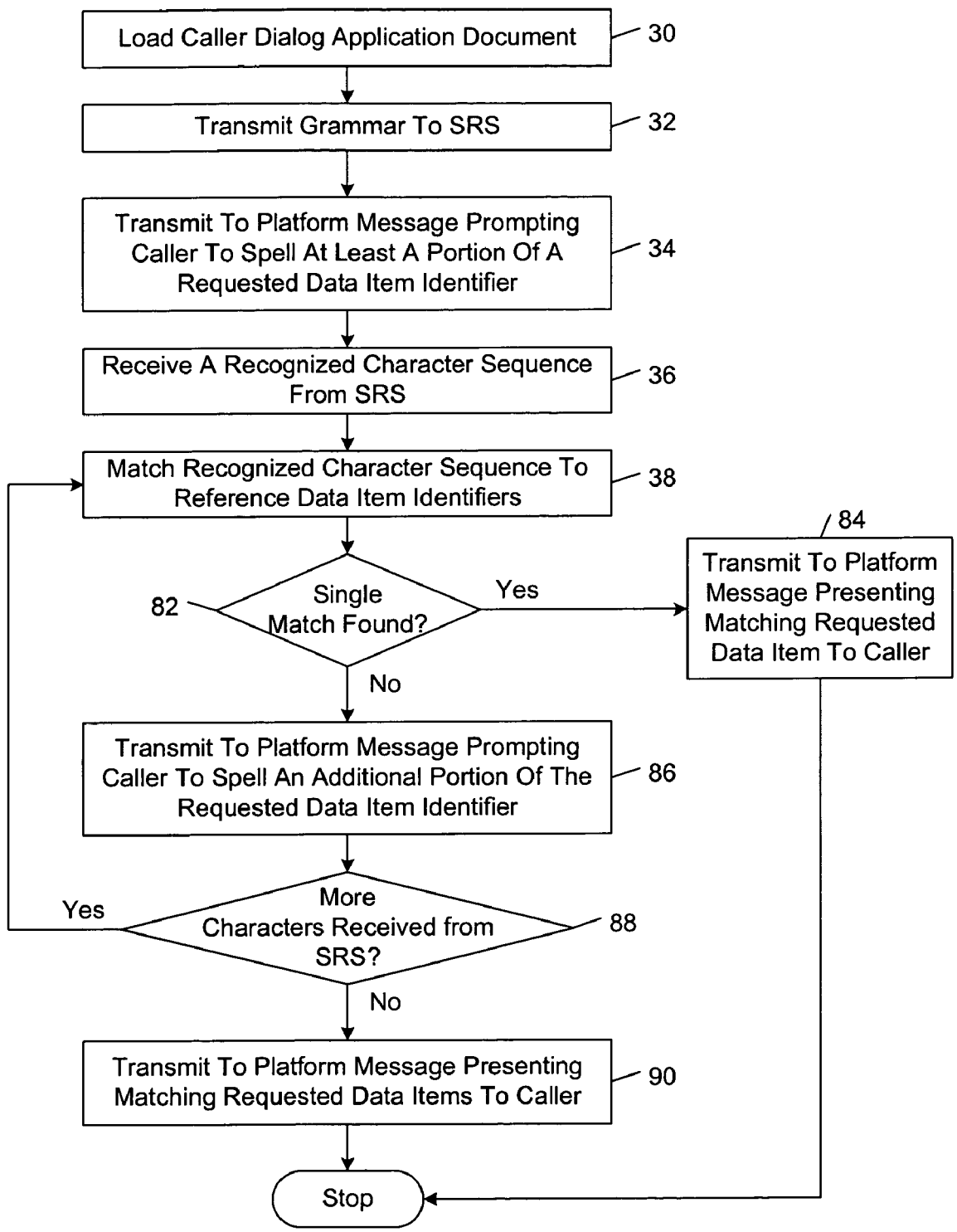
FIG. 2 is a flow diagram of an embodiment of a voice-based caller interface method.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

Multiple caller interface embodiments are described in detail below. These embodiments provide efficient and accurate lookup of a reference data item linked to a string of characters that are uttered by a caller. These embodiments compensate for possible misrecognition of spoken characters by a speech recognizer in a way that does not require repeated recompiling of a new speech recognition grammar after each character has been recognized. This enables a caller interface service to be implemented in a distributed network environment in a way that does not involve repeated calls between the caller interface application and the speech recognition platform and therefore does not introduce delays in the dialog between a caller and the caller interface service.

FIG. 1 shows an embodiment of an interface system 10 for a caller 12. Interface system 10 includes a voice platform 14, a voice browser 16, and a document server 18. The voice platform 14 includes a speech recognition system 20 and a speech synthesis system 22. The speech recognition system 20 may include various processing modules, including a sampling and analog-to-digital conversion module, a feature extraction module, a speech recognizer module, and a natural language understanding module. The voice platform 14, the voice browser 16, and the document server 18 are not limited to any particular hardware or software configuration, but rather they may be implemented in any computing or processing environment, including in digital electronic circuitry or in computer hardware, firmware, or software, and may be supplemented by or incorporated in one or more specially designed ASICs (application-specific integrated circuits). In one exemplary implementation, the voice platform 14 and the voice browser 16 are implemented on a general purpose computer system and the document server 18 is implemented on a separate web server computer system.

The voice platform 14 interfaces between the voice browser 16 and the caller 12. The document server 18 stores a caller interface application document 24, which may be implemented in any voice-based programming language, including any voice-based extensible markup language, such as VoiceXML and SALT (Speech Application Language Tags) extensions to HTML, XHTML, and XML. The voice browser 16 loads the caller interface application document 24 and creates an execution environment for the caller interface application document 24. The caller interface application document 24 controls the interaction between the voice browser 16 and the voice platform 14 to create for the caller 12 a voice-based caller interface (or service) consisting of a sequence of interaction dialogs between the caller 12 and the voice platform 14.

In operation, the caller 12 dials a telephone number corresponding to the caller interface service that is controlled by the caller interface application document 24. A telephone network 26 (e.g., a PSTN) transmits the call to the voice platform 14, which passes the call to the voice browser 16. The voice browser 16 answers the call, and loads and executes the caller interface application document 24 corresponding to the telephone number dialed by the caller 12. The caller interface application document 24 may direct the voice browser 14 to interact with the voice platform 14 to perform any of the following exemplary actions: send vocal prompts, messages, or other audio content (e.g., music) to the caller 12; accept DTMF input from the caller 12; and accept voice input from the caller 12.

FIG. 2 shows an embodiment of a method implemented by the voice browser 16 operating under the control of an embodiment of the caller interface application document 24 to create a voice-based interface for caller 12.

The voice browser 16 loads the caller interface application document 24 in response to receipt of a call to the telephone number corresponding to the caller interface application document 24 (block 30).

After loading the caller interface application document 24 (block 30), the voice browser 16 transmits a grammar to the speech recognition system (SRS) 20 (block 32). The grammar provides syntactic constraints for the speech recognition system 20, which limit the types of characters or words that the speech recognition system 20 will recognize. The grammar specifies all of the characters that may be spoken by the caller 12 when entering a requested data item identifier. In some implementations, the grammar specifies a set of alphanumeric characters. FIG. 3 shows an exemplary grammar specifying all of the letters from "a" through "z" in accordance with SRGS (Speech Recognition Grammar Specification) Version 1.0.

The voice browser 16 also transmits to the caller 12 a greeting and a message prompting the caller 12 to spell at least a portion of an identifier corresponding to a requested data item (block 34). In some implementations, the voice browser 16 directs the speech recognition system 20 to wait for the caller 12 to pause before recognizing the caller's utterances and transmitting the recognized characters to the voice browser 16.

Data items are any type of data that may be accessed by the voice browser 16, including an account balance, a person's telephone number, and a person's mailing address. A requested data item (e.g., an account balance) may be transmitted to the caller 12 or a requested data item may be operated on by the voice browser (e.g., the voice browser may transfer the caller to the telephone number corresponding to a requested identifier linked to a person). The requested data item and the identifier for the requested data item may be the same or different.

The voice browser 16 receives a recognized character sequence from the speech recognition system 20 (block 36). The recognized character sequence may correspond to all or only a portion of the characters of an identifier for a requested data item. In response to the received sequence of recognized characters, the voice browser 16 attempts to match the recognized character sequence to a set of reference data item identifiers (block 38).

Figure 4:
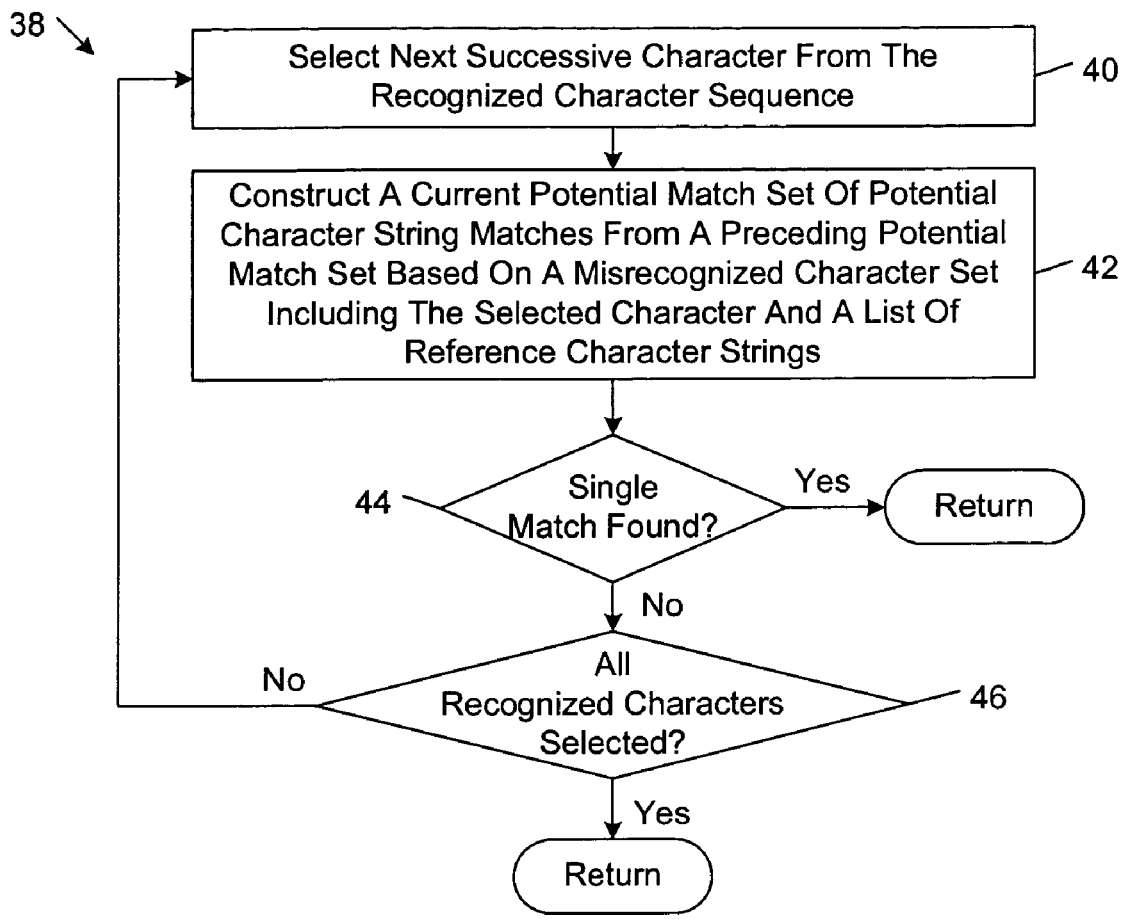
FIG. 4 is a flow diagram of an embodiment of a method of matching a recognized character sequence to reference data item identifiers.

FIG. 4 shows an embodiment of a method implemented by the voice browser 16 for matching a recognized character sequence to reference data item identifiers (block 38). In accordance with this method, the voice browser 16 selects the next successive character from the recognized character sequence beginning with the first recognized character (block 40). The voice browser 16 then constructs a current match set of potential character string matches from a preceding potential match set based on a set of misrecognized characters including the selected character and a list of reference character strings (block 42). The terms "set" and "list" are used interchangeably herein. The voice browser 16 repeats the process (blocks 40 and 42) until a single match is found (block 44) or all the recognized characters in the sequence have been selected (block 46).

Figure 5:
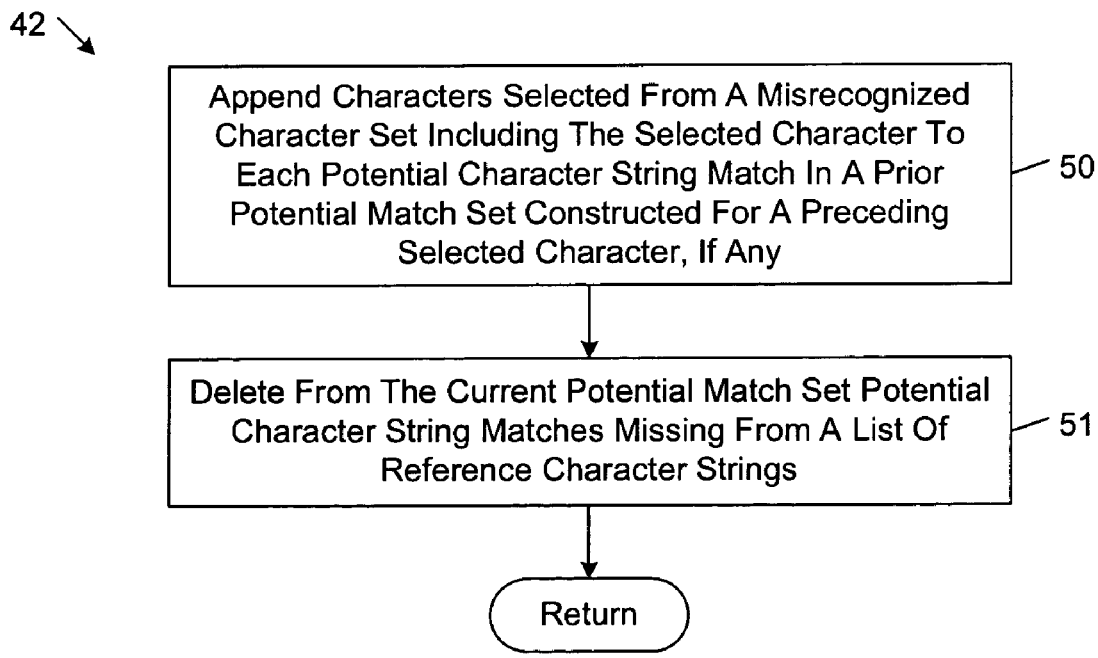
FIG. 5 is a flow diagram of an embodiment of a method of constructing a current potential match set of character strings potentially matching a requested data identifier.

FIG. 5 shows an embodiment of a method implemented by the voice browser 16 for constructing a current potential match set of potential character string matches from a preceding potential match set (block 42). In accordance with this method, the voice browser 16 appends characters selected from a set of misrecognized characters including the selected character to each potential character string match in a prior potential match set constructed for a preceding selected character, if any (block 50). The voice browser 16 then deletes from the current potential match set potential character string matches missing from a list of reference string characters (block 51).

FIG. 6 shows an implementation of a table 52 containing misrecognized character sets 54, 56, 58, 60, and 62, each containing a respective set of characters likely to be misrecognized for one another by the speech recognition system 20. The characters in sets 54-62 may be determined empirically. In the illustrated embodiment; set 54 consists of the characters B, C, D, E, G, P, T, V, and Z; set 56 consists of the characters A and K; set 58 consists of the characters F and S; set 60 consists of the characters I and Y; and set 62 consists of the characters U and W. Other embodiments may include different sets of misrecognized characters.

FIG. 7 shows a reference data item table 70 and multiple tables 72, 74, 76, 78, 80 that contain respective sets of reference character strings that are derived from the reference data item table 70. The reference data item table 70 contains a list of exemplary reference data items (e.g., identifiers corresponding to the names of people contained in a database). In the illustrated embodiment, each table 72-80 contains a set of reference character strings that are the same in character length; the character lengths of reference character strings in different tables are different. Table 72 (List 1) contains a list of unique (without any duplicates) single characters corresponding to the first letters of the reference data items in table 70. Table 74 (List 2) contains a list of unique two-character combinations corresponding to the first two letters of the reference data items in table 70. Table 76 (List 3) contains a list of unique three-character combinations corresponding to the first three letters of the reference data items in table 70. Table 78 (List 4) contains a list of unique four-character combinations corresponding to the first four letters of the reference data items in table 70. Table 80 (List 5) contains a list of unique five-character combinations corresponding to the first five letters of the reference data items in table 70. In some implementations, all of the data contained in tables 70-80 may be contained in a single table or data structure that is parsable by the voice browser 16.

The following example illustrates an exemplary sequence of steps that are implemented by the voice browser in accordance with the methods of FIGS. 4 and 5. In this example, the caller 12 speaks the letters T H W I N, but the speech recognition system 20 recognized the spoken letters as V H W Y N.

The first spoken letter is T, but the recognizer recognizes it as V. As shown in the misrecognized character table 52 of FIG. 6, V is likely to be misrecognized for B, C, D, E, G, P, T, V, and Z, so all items listed in table 72 except M are considered potential matches. This is shown in Table 1 below.

TABLE 1

First Recognized Character

| Letter Spoken | Letter Recognized | Likely to be Misrecognized for | Previous Potential Character String Matches | New Potential Character String Matches |
|---|---|---|---|---|
| T | V | B, C, D, E, G, P, T, V, Z | None | C D E T |

The second spoken letter is H, which is recognized correctly. H is not in the misrecognized character table 52, so only the letter H is appended to the current list of potential character string matches (i.e., C, D, E, T) and each resulting combination (i.e., CH, DH, EH, TH) is looked up in reference character string table 74 to see if there is a potential match. Since each two-character potential character string matches a corresponding reference character string in table 74, all two-character potential character strings except MA remain as possible matches for the next step and therefore added to the new potential match set in Table 2.

TABLE 2

First Two Recognized Characters

| Letter Spoken | Letter Recognized | Likely to be Misrecognized for | Previous Potential Character String Matches | New Potential Character String Matches |
|---|---|---|---|---|
| H | H | H | C D E T | CH DH EH TH |

The third letter spoken is W, which is recognized correctly. Based on the misrecognized character table 52, W also is likely to be misrecognized for U, so each of the letters W and U is appended to the items in the preceding potential match set and the voice browser 16 checks to see if the resulting letter combinations exist in reference character string table 76. The combinations CHU, THU, and THW all exist in table 76 and therefore these combinations remain as possible matches for the next iteration.

TABLE 3

First Three Recognized Characters

| Letter Spoken | Letter Recognized | Likely to be Misrecognized for | Previous Potential Character String Matches | New Potential Character String Matches |
|---|---|---|---|---|
| W | W | U, W | CH DH EH TH | CHU THU THW |

The fourth letter spoken is I, which is recognized as Y. Based on the misrecognized character table 52, Y is likely to be misrecognized for I, so each of these letters is appended on to the possible matches from the previous step and the voice browser 16 checks to see if the resulting character strings exist in reference character string table 78. The combinations CHUY and THWI exist and therefore these character strings are considered as possible matches for the next iteration.

TABLE 4

First Four Recognized Characters

| Letter Spoken | Letter Recognized | Likely to be Misrecognized for | Previous Potential Character String Matches | New Potential Character String Matches |
|---|---|---|---|---|
| I | Y | I, Y | CHU THU THW | CHUY THWI |

The fifth level spoken is N which is recognized as N. N is not in the misrecognized character table 52, so only N is appended the items in the preceding potential match set and the voice browser 16 checks to see if the resulting letter combinations exist in reference character string table 80. In this case, there is only one potential character string match—namely, THWIN, which corresponds to the reference data item Gary Thwing—and the process returns "Gary Thwing" as the matching requested data item.

TABLE 5

First Five Recognized Characters

| Letter Spoken | Letter Recognized | Likely to be Misrecognized for | Previous Potential Character String Matches | New Potential Character String Matches |
|---|---|---|---|---|
| N | N | N | CHUY THWI | THWIN |

Referring back to FIG. 2, after the voice browser 16 attempted to match the recognized character sequence to the reference data item identifiers (block 38), voice browser 16 determines whether a single match was found (block 82). If so, the voice browser 16 transmits to the voice platform 14 a message presenting the matching requested data item (e.g., the name "Gary Thwing") to the caller for confirmation (block 84). If a single match was not found (block 82), the voice browser 16 transmits to the voice platform 14 a message prompting the caller to spell an additional portion of the requested data item identifier (block 86).

If the caller spells additional characters and the voice browser 16 receives additional recognized characters from the speech recognition system 20 (block 88), the voice browser 16 attempts to narrow the list of potential matches in the current potential match set by matching the recognized character sequence including the additional recognized characters to the reference data item identifiers (block 38). If the voice browser 16 does not receive any additional recognized characters from the speech recognition system 20 (block 88), the voice browser 14 transmits to the platform a message presenting the data items corresponding to the potential character string matches in the current potential match set (block 90). At this point, the caller 12 may be prompted to select one of the presented data items as the requested data item.

Although systems and methods have been described herein in the context of particular machine and computing environments, these systems and methods are not limited to any particular hardware or software configuration, but rather they may be implemented in any computing or processing environment, including in digital electronic circuitry or in computer hardware, firmware or software.

Referring to FIG. 8, in some embodiments, the caller interface application VoiceXML) as a single document file 91 that contains script 92 for controlling the caller dialog, script 94 for identifying matching reference data item(s), at least one data structure 96 containing the sets of misrecognized characters, and at least one data structure 98 containing the reference character strings. In other embodiments, the data elements contained in document file 91 may be contained in multiple document files.

Other embodiments are within the scope of the claims.

What is claimed is:

1. A machine-implemented caller interface method, comprising:

receiving a sequence of recognized characters beginning with a first recognized character and ending with a last recognized character;

selecting successive characters one at a time from the recognized character sequence in consecutive order beginning with the first recognized character;

for each selected character, constructing a current potential match set of potential character string matches by:

appending the selected character in the instance the selected character is not included in a set of misrecognized characters or appending one or more characters selected from the set of misrecognized characters including the selected character to each potential character string match in a prior potential match set constructed for a preceding selected character, to obtain a current set of potential character string matches, wherein the prior potential match set exists but is empty for the first selected character; and deleting from the current set of potential character string matches potential character string matches missing from a list of reference character strings; and transmitting for presentation to a caller a reference data item corresponding to the potential character string match in a current potential match set containing a single potential character string match after non-matching potential character string matches have been deleted.

2. The method of claim 1, wherein the sequence of recognized characters is received from a speech recognition system.

3. The method of claim 2, further comprising transmitting to the speech recognition system a grammar identifying characters to be recognized.

4. The method of claim 1, wherein each misrecognized character set contains at least one character likely to be misrecognized for the corresponding selected character by a speech recognition system.

5. The method of claim 1, wherein the deleting comprises comparing potential character string matches and reference character strings of equal character length.

6. The method of claim 1, wherein the misrecognized character sets and the reference character strings are stored in a single document file.

7. The method of claim 6, wherein each list includes a respective table containing reference character strings of equal character length, and different tables contain reference character strings of different respective character length.

8. The method of claim 1, further comprising transmitting for presentation to the caller reference data items corresponding to the potential character string matches in the current potential match set constructed after all recognized characters in the sequence have been selected.

9. The method of claim 1, further comprising transmitting to the caller a message prompting the caller to spell at least a portion of an identifier of a requested reference data item.

10. The method of claim 9, wherein after all recognized characters in the sequence have been selected and multiple potential character string matches remain in the current potential match set, further comprising transmitting to the caller a message prompting the caller to spell an additional portion of the identifier of the requested data item.

11. A machine-readable medium storing machine-readable instructions for causing a machine to:

receive a sequence of recognized characters beginning with a first recognized character and ending with a last recognized character;

select successive characters one at a time from the recognized character sequence in consecutive order beginning with the first recognized character;

for each selected character, construct a current potential match set of potential character string matches by:

appending the selected character in the instance the selected character is not included in a set of misrecognized characters or appending one or more characters selected from the set of misrecognized characters including the selected character to each potential character string match in a prior potential match set constructed for a preceding selected character, to obtain a current set of potential character string matches, wherein the prior potential match set exists but is empty for the first selected character; and deleting from the current set of potential character string matches potential character string matches missing from a list of reference character strings; and transmit for presentation to a caller a reference data item corresponding to the potential character string match in a current potential match set containing a single potential character string match after non-matching potential character string matches have been deleted.

12. The medium of claim 11, further comprising machine-readable instructions for causing a machine to transmit to the speech recognition system a grammar identifying characters to be recognized.

13. The medium of claim 11, wherein each misrecognized character set contains at least one character likely to be misrecognized for the corresponding selected character by a speech recognition system.

14. The medium of claim 11, further comprising machine-readable instructions for causing a machine to compare potential character string matches and reference character strings of equal character length.

15. The medium of claim 11, wherein the misrecognized character sets and the reference character strings are stored in a single document file.

16. The medium of claim 15, wherein each list includes a respective table containing reference character strings of equal character length, and different tables contain reference character strings of different respective character length.

17. The medium of claim 11, further comprising machine-readable instructions for causing a machine to transmit for presentation to the caller reference data items corresponding to the potential character string matches in the current potential match set constructed after all recognized characters in the sequence have been selected.

18. The medium of claim 11, further comprising machine-readable instructions for causing a machine to transmit to the caller a message prompting the caller to spell at least a portion of an identifier of a requested reference data item.

19. The medium of claim 18, further comprising machine-readable instructions for causing a machine to transmit to the caller a message prompting the caller to spell an additional portion of the identifier of the requested data item after all recognized characters in the sequence have been selected and multiple potential character string matches remain in the current potential match set.

20. The medium of claim 11, wherein the machine-readable instructions are implemented in a voice-based extensible markup language.

21. A caller interface system, comprising: a computer;

a voice platform including a telephony interface and a speech recognition system; and a voice browser interfaced with the voice platform, the voice browser implemented on a computer and programmed to:

receive a sequence of recognized characters beginning with a first recognized character and ending with a last recognized character;

select successive characters one at a time from the recognized character sequence in consecutive order beginning with the first recognized character;

for each selected character, construct a current potential match set of potential character string matches by:

appending the selected character in the instance the selected character is not included in a set of misrecognized characters or appending one or more characters selected from the set of misrecognized characters including the selected character to each potential character string match in a prior potential match set constructed for preceding selected character, to obtain a current set of potential character string matches, wherein the prior potential match set exists but is empty for the first selected character; and deleting from the current set of potential character string matches potential character string matches missing from a list of reference character strings; and transmit for presentation to a caller a reference data item corresponding to the potential character string match in a current potential match set containing a single potential character string match after non-matching potential character string matches have been deleted.

22. The system of claim 21, further comprising a speech recognition system operable to transmit the sequence of recognized characters to the voice browser.

23. The system of claim 22, wherein the voice browser is programmed to transmit to the speech recognition system a grammar identifying characters to be recognized.

24. The system of claim 21, wherein each misrecognized character set contains at least one character likely to be misrecognized for the corresponding selected character by a speech recognition system.

25. The system of claim 21, wherein the voice browser is programmed to compare potential character string matches and reference character strings of equal character length.

26. The system of claim 21, wherein the misrecognized character sets and the reference character strings are stored in a single document file loadable by the voice browser.

27. The system of claim 26, wherein each list includes a respective table containing reference character strings of equal character length, and different tables contain reference character strings of different respective character length.

28. The system of claim 21, wherein the voice browser is programmed to transmit for presentation to the caller reference data items corresponding to the potential character string matches in the current potential match set constructed after all recognized characters in the sequence have been selected.

29. The system of claim 21, the voice browser is programmed to transmit to the caller a message prompting the caller to spell at least a portion of an identifier of a requested reference data item.

30. The system of claim 29, the voice browser is programmed to transmit to the caller a message prompting the caller to spell an additional portion of the identifier of the requested data item after all recognized characters in the sequence have been selected and multiple potential character string matches remain in the current potential match set.

* * * * *